Jan. 10, 1950    R. DAON    2,494,288
AUTOMOBILE SPOTLIGHT
Filed Oct. 25, 1946

INVENTOR.
RENE DAON
BY William S. Gluck
ATTORNEY.

Patented Jan. 10, 1950

2,494,288

UNITED STATES PATENT OFFICE 2,494,288

AUTOMOBILE SPOTLIGHT

Rene Daon, Norwalk, Conn., assignor to Yankee Metal Products Corporation, Norwalk, Conn., a corporation of New York Application October 25, 1946, Serial No. 705,581

2 Claims. (Cl. 240—61.12)

This invention relates to automobile spotlights, and, more particularly, to spotlights which are attached exteriorly of the car.

The automobile spotlight to which this invention pertains is that type which comprises a straight bracket arm which is attached at one end to the exterior of the car, usually, to the front door beside the driver or to the windshield post (so that the spotlight may be readily reached by the driver by lowering the door window). The arm extends outwardly substantially normal to the car exterior and substantially horizontal, and the spotlight is secured at the distal end of the outwardly extending arm. The spotlight itself is shaped symmetrically about an axis through the center of the lens and bulb; for convenience in terminology, this will be referred to as the "symmetrical axis" of the lamp. The axis through the spotlight or lamp at its securement to the bracket arm and normal to its symmetric axis will be referred to as the "secondary axis" of the lamp.

One of the objects of the invention is to provide in an automobile spotlight of the type described, a construction which will enable the device to be readily adjusted to turn the lamp 360° about the said secondary axis and also about the bracket arm axis and to be securely locked in the said adjusted positions, the improved construction being such that no part of the device can be removed without first opening the automobile door, the device being secured to the flange thereof. Another object of the invention is to provide a bracket means for securing the device to the flange of an automobile door which is readily attached thereto yet in a manner to prevent its removal therefrom except when the door is open.

For the attainment of the foregoing and such other objects as may appear or be pointed out herein I have shown a preferred embodiment of my invention in the accompanying drawing, wherein.

Figure 1:
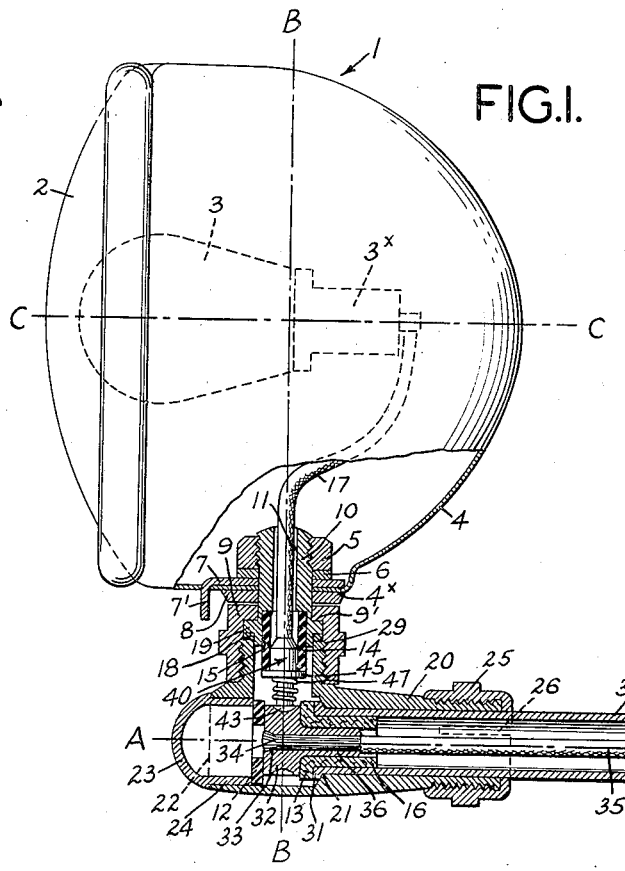
Fig. 1 is a sectional elevation of the improved automobile spotlight (most of the lamp itself not being in section)

The lamp 1 of the improved device, as customary in spotlights, is symmetrical about an axis C—C through the center of lens 2 and bulb 3; this is the "symmetrical axis" of the lamp referred to in the statement of invention. Lamp 1 is secured to the bracket arm 30 by means including a bushing 10. Bushing 10, which has an annular enlargement or lip 19 near its lower end, is passed (from outside the lamp) through a circular opening provided in a flattened portion $4^x$ of lamp casing wall 4. But before passing bushing 10 through the said lamp casing opening, the bushing is first inserted through a coupling nut 9 with the interior annular shoulder 9' thereof resting on annular lip 19 of the bushing, as clearly shown in Fig. 1. Following this insertion through coupling nut 9, a spacer ring 8 is slipped over the bushing to rest on coupling nut 9, as shown in Fig. 1. These parts are then assembled on the lamp by passing the bushing through the said opening in its wall. From the inside of the lamp, a flat member 7 having a down-turned flange 7' and a circular opening is slipped over the inserted end of the bushing; flat portion $4^x$ of the lamp wall 4 is provided with an opening for flange 7'; member 7, more particularly its flange 7', forms part of the lamp door fastening means (not shown). Next a shakeproof washer 6 is slipped over the bushing and finally a lock nut 5 is screwed tightly on the threaded end of the bushing. The securement on the inside of lamp wall $4^x$ (i. e., between lock nut 5 and the lamp) is tight, so that bushing 10 is secured in a fixed position on the lamp body. However, the distance between lamp wall $4^x$ and annular lip 19 of the bushing is somewhat greater than the combined thickness of spacer 8 and the coupling nut 9, so that coupling nut 9 may be turned freely relative to bushing 10, although being inseparable from the lamp by reason of annular lip 19 of the bushing.

Coupling nut 9 serves to secure lamp 1 to bracket arm 30, and more particularly, to a swivel housing 20 which is associated with bracket arm 30 in a manner fully described subsequently. In any event, swivel housing 20 has a threaded lateral boss 29 to which coupling nut 9 is screwed; a swivel washer 18 is interposed between the two. Lamp 1 is secured in this manner at the distal end of bracket arm 30, with the symmetrical axis C—C of the lamp parallel to the axis A—A of the bracket arm.

The axis B—B centrally through the bushing 10 and normal to symmetrical axis C—C of the lamp (and also bracket arm axis A—A) is the "secondary axis" of the lamp referred to in the statement of invention. One of the stated objects of invention is an automobile spotlight having a lamp 1 which can be turned 360° about the secondary axis B—B of the lamp. This is possible in the device as thus far described: Lamp 1 including bushing 10 secured thereto as described, rotate relative to coupling nut 9 which is secured (i. e., screwed) to threaded lateral boss 29 of the bracket arm swivel housing 20. It is clear that coupling nut 9 is not screwed on too tightly, in order that the bushing 10 may freely rotate, the friction being reduced by swivel washer 18. But when it is desired to lock lamp 1 in any angular position (about secondary axis B—B), coupling nut is drawn down tightly.

The second stated object of invention is an automobile spotlight having a lamp 1 which can be turned 360° about the bracket arm axis A—A. So far as the means for achieving this is concerned, the lamp 1 may be tightly secured to threaded boss 29 of swivel housing 20 (so as to be non-turnable about secondary axis B—B of the lamp) and it will be so assumed during the following description. Swivel housing 20 is tubular and is mounted at the end of bracket arm 30 for rotation about central axis A—A thereof.

One of the objects of invention was stated to be a spotlight attached exterior of a car which will be difficult to remove (as by an unauthorized person). For this reason swivel housing 20 is assembled on bracket arm 30 in a manner making it impossible to be removed therefrom from the distal end of the bracket arm. That is, swivel housing 20 cannot be moved leftwardly, Fig. 1, on bracket arm 30 for withdrawal from the left or distal end of the arm. This is due to an annular enlargement or lip 31 at the left or distal end of bracket arm 30 (which although shown in Fig. 1 as a tube—for reasons soon apparent—may be made solid so far as its articulation to swivel housing 20 is concerned). Lip or flange 31 of the bracket arm abuts against an annular shoulder 21 provided in the hollow of tubular housing 20, to block movement of the housing to the left. It is clear therefore that housing 20 and arm 30 can only be assembled by inserting the right end of arm 30 through opening 22 at the left end of the housing, this opening being of somewhat greater diameter than the outer diameter of lip 31 on arm 30. Left opening 22 of the swivel housing is normally closed by a cap 23 which is force fitted into the bore of the housing (or may be screwed therein, as an alternate construction). Cap 23, which is preferably hollow, as shown, has a tubular portion 24 which, in addition to securing the cap in place, also serves to hold the swivel housing 20 in proper position relative to bracket arm 30, as will be seen.

It is thus seen that lamp 1 (secured to swivel housing 20, in the manner described) may turn 360° about the bracket arm axis A—A, by rotation of the swivel housing on bracket arm 30. To lock the lamp in any angular position (about axis A—A) a collet nut 25 is screwed on the threaded end of tubular housing 20, that end of the housing wall having a pair of longitudinal slots 26, which give the parts a collet action in locking the swivel housing to the bracket arm.

The structure thus far described will thus provide an automobile spotlight having a lamp 1 which can be turned 360° about the secondary axis B—B of the lamp and, 360° about the bracket arm axis A—A, and which can be locked in any angular position (about either axis). Considering the spotlight apart or unattached to the car, it is thus seen that the improved device provides for turning about two axes (A—A and B—B) normal to one another.

The second aspect of the invention, the principal object of which was stated to be an automobile spotlight in which the connecting wire is completely concealed, is achieved by making the bracket arm 30 and other parts, such as bushing 10, tubular and running the wire directly from the interior of lamp 1 through the hollow thus provided in bracket tube 30 and the connecting or screwing parts. In an automobile spotlight having no, or a limited angular extent of, adjustive turning, the connecting wire would be run in this manner. In its grander aspect, this invention contemplates an automobile spotlight in which the connecting wire is completely concealed and, which, nevertheless, can be turned 360° about the secondary axis of the lamp and/or the bracket arm axis.

Figure 3:
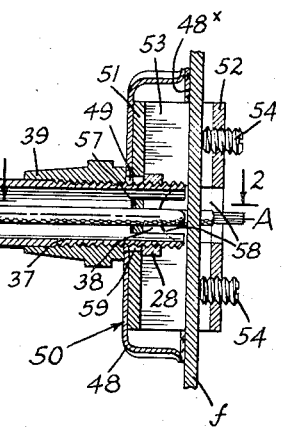
Fig. 3 is a sectional elevational detail of the terminal contact, on enlarged scale.

Bushing 10 has an inner central bore 11 through which is passed a short electrical wire 17, one end of which is connected to the socket $3^x$ within lamp 1, the other end being connected to a terminal contact member designated generally 40. Referring to Fig. 3, terminal contact member 40 comprises an inner tube 41, preferably of brass, having an annular flange or lip 42 at its upper end and closed at its lower end by a solid piece of brass or solder 43 which serves as the contact point. Encircling inner tube 41 is an outer and shorter tube 44, at the lower end of which is an annular flange or lip 45. It will be observed that contact 43 extends outwardly or laterally of inner tube 41 to present an annular shoulder 46, between which and the flanged end of outer tube 44 is interposed a compression coil spring 47 which tends to force the inner tube 41 downwardly. The strands $17^x$ of wire 17 are secured within inner tube 41 by soldering, crimping or similar means.

The lower end of bushing 10, Fig. 1, has an enlarged mouth 15 within which is force fitted a short tube 14 of fibre or other suitable insulating material. Terminal contact member 40 is force fitted in insulating tube or bushing 14, with the flange or lip 45 of outer brass tube 44 abutting the lower end of the insulating bushing 14.

Centrally located within the swivel housing 20 on the bracket arm axis A—A is a contact spool 32, directly underlying the contact point 43 of terminal contact 40, and disposed substantially centrally of the secondary axis B—B of the lamp. Contact spool 32 has a center bore 33 in which is soldered one end 34 of an electric wire 35 leading through the hollow of bracket tube 30 to the interior of the car, as will be more fully described subsequently. Contact spool 32 has a long hub portion 36 which is force fitted in a bushing 16 of fibre or other insulating material, which is itself force fitted in the bracket tube 30. Insulating bushing 16 has an outwardly turned flange 13 at its left end, extending beyond the left end of tube 30. It will be seen from Fig. 1 that flange 13 of insulating bushing 16 and annular lip 31 of bracket tube 30 are interposed between the contact spool 32 and the annular shoulder 21 of swivel housing 20. At the other side of contact spool 32 and interposed between it and the inner edge of tubular portion 24 of end cap 23 is an insulating washer 12.

Contact spool 32 and the parts associated therewith are assembled in swivel housing 20 in the following manner: With end cap 23 removed from the swivel housing, and after inserting bracket tube 30 from that end, with its annular lip 31 abutting annular shoulder 31 of the housing, insulating bushing 16 is inserted and forced in bracket tube 30 with its flange 13 abutting the lip 31 of the tube. The entire length of connecting wire 35 is then passed through the tube 30 and the hub 36 of contact spool 32 forced in insulating bushing 16, with the right side of the spool abutting flange 13 of the insulating bushing. Insulating washer 12 is then placed at the left side of the contact spool, and the left open end 22 of the swivel housing closed by cap 23, its tubular portion 24 being forced into the housing end, with its inner edge abutting insulating washer 12. It will thus be seen that contact spool 32 is securely held against movement between the tubular portion 24 of the cap and annular shoulder 21 of the swivel housing, and is positioned centrally of contact point 43 and secondary axis B—B of the lamp. Also, it is securely held against rotation by the tight fitting of its hub 36 in insulating bushing 16 and, of the latter in bracket tube 30, and is positioned by the bushing centrally on the bracket axis A—A.

The coil compression spring 47 of terminal contact 40 forces contact point 43 downwardly in electrical engagement with the cylindrical surface of contact spool 32, to complete the circuit from the lamp to the current source in the car. This circuit remains completed despite the 360° turning of the lamp on secondary axis B—B or the 360° turning of the lamp on bracket axis A—A. In the first case, lamp 1, bushing 10, terminal contact member 40, and, particularly, inner tube 41 thereof and its contact point or area 43, all rotate on the secondary axis B—B, contact point 43 rotating in contact at some point or area of the cylindrical surface of contact drum 32 (depending on the angular position of the lamp and the swivel housing 20 about the bracket axis A—A). In the second case, adjustive turning on axis A—A, the lamp, swivel housing 20, terminal contact member 40, particularly, contact point 43 thereof, all turn on the bracket axis A—A, contact point 43 turning or sliding in contact with the cylindrical surface of contact spool 32.

Figure 2:
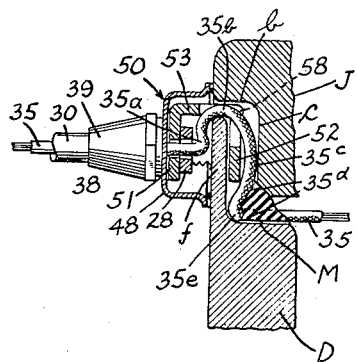
Fig. 2 is a longitudinal section, taken on the line 2—2 of Fig. 1, of the bracket attachment to a door flange, on a scale reduced from that of Fig. 1.

The proximal end of bracket arm 30 may be secured to a suitable bracket or fixture for attaching the improved spotlight at some point exteriorly of the car. The improved automobile spotlight shown in the drawings is of the type which is secured to the flange of the car door at any selected point thereof, usually the forward flange of the front, left door at an elevation to enable the driver to readily turn the spotlight through the open window of the door. The bracket for attaching the spotlight to the flange includes a channel bar 50 having a left flange 51, a right flange 52, and a connecting web 53. Left flange 51 is provided with a hole 59 at a central point thereof to receive the threaded (proximal) end 37 of bracket arm 30. The flange attaching bracket also includes a housing 48 which is disposed in abutting relation to the exterior of the door and completely conceals channel 50 and the other operative parts of the bracket. Housing 48 has a central hole 49 wherethrough the threaded end of bracket arm 30 is inserted before inserting in hole 59 of the channel. A lock nut 28 is placed on the threaded end of the bracket arm that has been inserted through hole 59 of channel flange 51, to prevent withdrawal of the bracket arm from the flange attaching bracket (unless lock nut is first screwed back and off that end of bracket arm 30). The extent that lock nut 28 is screwed (to the left, Fig. 1) on the end of the bracket arm depends on the thickness of the flange of car door D, Figs. 1 and 2. Channel bar 50 is placed on door flange f with its right flange 52 on the inside and its left flange 51 exteriorly of the door, and with the edge of the door flange abutting the web 53 of the channel, as clearly shown in Fig. 2. The channel bar is firmly secured to the door flange by two set screws 54, Fig. 1, threaded at spaced points in the right channel flange 52. It is clearly shown in Fig. 1 how the channel bar is secured to the door flange between the end of bracket arm 30, abutting one side of the door flange, and set screws 54, abutting the other side.

After channel bar 50 is secured in this manner to door flange f, housing or casing 48 is positioned against the exterior of the door, a felt gasket 48ˣ being interposed between the edge of the housing and the door to prevent marring the latter. A lock nut 39 threaded on bracket arm 30 is drawn up tight to hold the housing 48 securely in place.

Figure 4:
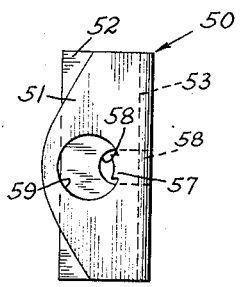
Fig. 4 is a front view of the channel bar employed in the car-door-flange attaching bracket.

The flange attaching bracket thus far described may be used for any type of bracket arm. It may, for example, be used for a bracket arm in the form of a solid rod instead of a tubular one, as is bracket arm 30 shown. As earlier explained, one of the reasons for making the bracket arm tubular is to provide an automobile spotlight in which the electric wire to the lamp is completely concealed. The flange attaching bracket has the following additional structural features which enable the electric wire, conducted through bracket tube 30, to be passed between the door flange and the door jamb without interfering with the closing of the door and in a manner effectively concealing the wire from view. Preferably centrally located (i. e., as to the length of channel bar 50, Fig. 1) is a slot 58 disposed at the corner between web 53 and right flange 52 of the channel bar, see Figs. 1 and 2, so that the slot cuts into both web 53 and right channel flange 52. The end (threaded) of tube 30 has a longitudinally disposed slot 38 which is disposed opposite to, or facing, the slot 58 of the channel. To maintain tube 30 and channel bar 50 in this proper angular relation, so that slot 38 of the tube 30 will be aligned opposite slot 58 of the channel bar 50, the left flange 51 of the latter is provided with a key 57, see Fig. 4, projecting into hole 59 thereof. Key 57 is aligned, see Fig. 1 and Fig. 4, with the channel slot 58. Tube 30 can be inserted in hole 59 in only one angular position, relative to the channel bar, with key 57 fitting and sliding in slot 38 of the tube; in this position slots 38 and 58 are opposite or aligned.

It will be recalled that the end of tube 30 abuts the door flange f, see esp. Fig. 1, hence, slot 38 is provided at the end of the tube for passage or clearance of wire 35 from the interior of the tube; this portion of the wire is designated 35ᵃ in Fig. 2. Wire 35 is then passed between the distal edge of door flange f, see Fig. 2, and surface b of door jamb J, the wire being received in corner slot 58 of the channel bar, and bent around the distal edge of the door flange; this portion of the wire is designated 35ᵇ in Fig. 2. The wire then passes between right channel flange 52 and surface c of the door jamb. Car doors are fitted with a bead or molding M of sponge rubber which encircles the door secured in the interior corner of the flange. Wire 35 is passed behind rubber bead M, as indicated by the portion thereof designated 35ᵈ, and brought into the interior of the car (right side of the door, Fig. 2), as shown. The spotlight is usually installed at a high point on the door, which is higher than the point in the car, usually on the dashboard, where wire 35 is required to be connected for current. This portion of the wire may be run vertically behind the rubber bead M, as designated 35ᵉ in Fig. 2, from the high point at the spotlight, to the low point at the dashboard, and then brought into the interior of the car at the lower level necessary to connect to the current source.

I claim:

1. In an automobile spotlight of the type having a bracket arm, a bracket for securing said arm to the door of a vehicle, and a spotlight lamp, in combination, means for securing said lamp for adjustable turning 360° about the longitudinal axis of said bracket arm, said arm having an outwardly-directed annular enlargement at its distal end, said means comprising a tubular member having an annular shoulder and a cavity of diameter somewhat larger than that of said annular enlargement of the bracket arm, said tubular member being disposed on the bracket arm with its said shoulder between the annular enlargement of the bracket arm and said door bracket whereby the tubular member is inseparable from the bracket arm, the said lamp being secured to the tubular member and said member being externally threaded at its proximal end and provided with a collet nut for securing the lamp in any position angularly about the bracket arm.

2. In an automobile spotlight of the type having a spotlight lamp having sealed closure, a secondary axis, and an aperture centered on said axis, a bracket arm, a bracket for securing said arm to the door of a vehicle, said arm having an outwardly-directed annular enlargement at its distal end, in combination, a tubular member having an annular shoulder and a cavity of diameter somewhat larger than that of said annular enlargement, said tubular member being disposed on the bracket arm with its said shoulder between the annular enlargement of the bracket arm and said door bracket whereby the tubular member is inseparable from the bracket arm, said member being externally threaded at its proximal end and provided with a collet nut for securing said tubular member in any position 360° angularly about the bracket arm, said tubular member having an externally threaded hub extending laterally therefrom, a sleeve member having an outwardly-directed annular enlargement at one end and externally threaded at its other end, said threaded end being received through said lamp aperture with its annular enlargement abutting the end of the hub, a lock nut within the lamp for said threaded end of the sleeve member, and a coupling nut having an inwardly-directed annular enlargement, screwed on said hub with its said inwardly-directed enlargement disposed between the exterior wall of the lamp and said outwardly-directed enlargement of the hub, the distance between the exterior wall of the lamp and the outwardly-directed enlargement of the hub being of predetermined extent whereby said coupling nut is inseparable from the assemblage.

RENE DAON.

REFERENCES CITED

The following references are of record in the file of this patent:

UNITED STATES PATENTS

| Number | Name | Date |
| --- | --- | --- |
| 1,259,867 | Humphreys et al. | Mar. 19, 1918 |
| 1,309,714 | Anderson | July 15, 1919 |
| 1,680,139 | Edelmann | Aug. 7, 1928 |
| 1,921,784 | Sklarek | Aug. 8, 1933 |
| 2,263,382 | Gotzinger | Nov. 18, 1941 |
| 2,321,861 | Sauer | June 15, 1943 |
| 2,338,780 | Poncher et al. | Jan. 11, 1944 |